United States Patent [19]
Schmidt et al.

[11] 4,322,520
[45] Mar. 30, 1982

[54] AROMATIC THERMOPLASTIC POLYPHOSPHONATOCARBONATE

[75] Inventors: Manfred Schmidt, New Martinsville, W. Va.; Ludwig Bottenbruch, Krefeld, Fed. Rep. of Germany; Dieter Freitag, Krefeld, Fed. Rep. of Germany; Werner Nouvertné, Krefeld, Fed. Rep. of Germany

[73] Assignee: Bayer Aktiengesellschaft, Leverkusen, Fed. Rep. of Germany

[21] Appl. No.: 160,644

[22] Filed: Jun. 18, 1980

[30] Foreign Application Priority Data

Jun. 22, 1979 [DE] Fed. Rep. of Germany ....... 2925208

[51] Int. Cl.³ .............................................. C08G 63/62
[52] U.S. Cl. .................... 528/167; 528/169; 528/196; 528/198; 528/204
[58] Field of Search ................................ 528/167, 169

[56] References Cited
U.S. PATENT DOCUMENTS 2,682,522  6/1954  Coover, Jr. et al. ............... 528/167
3,378,523  4/1968  Caldwell et al. .................... 528/169
3,597,394  8/1971  Rawlings ............................. 528/167
4,054,552  10/1977  Hoogeboom ....................... 528/167
4,223,104  9/1980  Kim et al. ............................ 528/169

FOREIGN PATENT DOCUMENTS 1025422  4/1966  United Kingdom ............... 528/169

Primary Examiner—Harold D. Anderson
Attorney, Agent, or Firm—Connolly and Hutz

[57] ABSTRACT

Thermoplastic polyphosphonatocarbonate prepared by polycondensing at least one aromatic dihydroxy compound with a diaryl carbonate and a phosphonic acid diaryl ester in the presence of a basic polycondensation catalyst at a temperature of from 80° to 340° and under a pressure of 600 to 0.1 mm Hg in an inert gaseous atmosphere, the molar ratio of diaryl carbonate to phosphonic diaryl ester being from 5:95 to 95:5 and the molar ratio of aromatic dihydroxy compound to the sum of diaryl carbonate and phosphonic acid diaryl ester being from 0.91:1 to 0.99:1, and following polycondensation, neutralizing said basic catalyst.

4 Claims, No Drawings

AROMATIC THERMOPLASTIC POLYPHOSPHONATOCARBONATE

The present invention relates to a process for the preparation of aromatic, thermoplastic polyphosphonatocarbonates, which is characterized in that aromatic dihydroxy compounds having 6 to 30 carbon atoms are reacted with diaryl carbonates and phosphonic acid diaryl esters in the presence of basic catalysts at temperatures between 80° C. and 340° C., preferably between 100° C. and 320° C., and under pressures between 600 mm Hg and 1.0 mm Hg, under an inert gas atmosphere, the molar ratio of diaryl carbonate to phosphonic acid diaryl ester being between 5:95 and 95:5, preferably between 15:85 and 85:15, and the molar ratio of aromatic dihydroxy compounds to the sum of diaryl carbonates and phosphonic acid diaryl esters being between 0.91:1 and 0.99:1, preferably between 0.93:1 and 0.97:1, and after the particular polycondensation reaction, the basic catalyst is neutralized.

The particular reaction time is between 20 and 5 hours, preferably between 15 and 7 hours, depending on the desired molecular weight and the particular rate of reaction.

The polyphosphonatocarbonates obtainable according to the invention should have number-average molecular weights Mn (measured by membrane osmometry in dioxane as the solvent) of at least 11,000, preferably of 11,000 to 200,000 and in particular of 20,000 to 80,000.

The polyphosphonatocarbonates obtainable according to the invention can also be characterized by relative solution viscosities $\eta_{rel}$ of 1.20 to 2.00, preferably of 1.24 to 140 ($\eta_{rel}$ at 25° C. in concentrations c of 0.5 g per 100 ml of $CH_2Cl_2$).

The polyphosphonatocarbonates obtainable according to the invention preferably correspond to the formula (1)

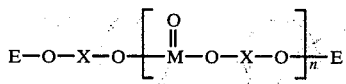

wherein
E is hydrogen or

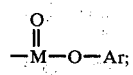

Ar is aryl having from 6 to 14 carbon atoms or said aryl substituted by at least one member selected from the group consisting of $C_1$–$C_4$-alkyl, fluorine, chlorine and bromine;
each

represents separately the connecting member

or the connecting member

with a ratio of connecting members

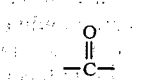

to connecting members

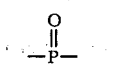

of between 5:95 and 95:5;

R is $C_1$–$C_{12}$-alkyl, $C_2$–$C_{12}$-alkyl, $C_6$–$C_{30}$-aryl, $C_6$–$C_{30}$-cycloalkyl, $C_6$–$C_{30}$-cycloalkenyl, $C_7$–$C_{30}$-aralkyl, $C_8$–$C_{30}$-aralkenyl or said aryl or said aralkyl or aralkenyl substituted by at least one member selected from the group consisting of $C_1$–$C_4$-alkyl, fluorine, chlorine and bromine;

X is the deshydroxy radical of an aromatic dihydroxy compound having 6 to 30 carbon atoms, and n is the average degree of polymerization which corresponds to a number-average molecular weight then measured by membrane osmometry in dioxene as the solvent of at least 11,000.

The polyphosphonatocarbonates obtainable according to the invention can in each case be built up either on the same deshydroxy radicals X or on different deshydroxy radicals, that is to say 2 or more different deshydroxy radicals.

Possible deshydroxy radicals X are, preferably those with 6 to 30 C atoms, which can also additionally contain sulphur or oxygen as hetero-atoms and can in turn be substituted by $C_1$–$C_4$-alkyl and/or by halogen. Examples of suitable diphenol radicals X are phenylene, diphenylene, alkylidene-bis-phenylene, alkylene-bis-phenylene, cycloalkylidene-bisphenylene, cycloalkylene-bis-phenylene, thio-bis-phenylene, oxy-bis-phenylene, sulphonyl-bis-phenylene, carbonyl-bis-phenylene or naphthylene, which can in each case be substituted by $C_1$–$C_4$-alkyl and/or by halogen, such as F, Cl or Br.

The polyphosphonatocarbonates obtained by the preparation process according to the invention are thermoplastics which are highly fire-repellent and very tough and can be shaped, without thermal damage, in processing units customary in industry, such as injection-moulding machines and extruders. The particularly preferred halogen-free species of the general structure (1) are also highly fire-repellent thermoplastics, which do not have the disadvantage of their processability being impeded, as is the case with fire-repellent, halogen-containing, high-molecular polycarbonates (see U.S. Pat. No. 3,334,154).

The present invention thus also relates to the polyphosphonatocarbonates obtainable according to the invention which, in contrast to the compounds known from the state of the art, contain no acid "phosphorus end groups", that is to say, specifically, no HO-P structure, and in particular no

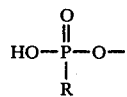

structures.

Phosphonatopolycarbonates were hitherto prepared exclusively using the corresponding phosphonic acid dihalides, in particular the dichlorides. (In this context, see U.S. Pat. No. 3,378,523, Belgian Pat. Specification No. 610,954, British Patent Specification No. 1,025,422, German Auslegeschrift No. 1,199,499, French Patent Specification No. 1,402,407 and Belgian Patent Specification No. 670,960).

However, products prepared in this manner are not stable to heat and thus of no significance in industry. (Compare also the publication by H. S. Kolesnikow et al. in Hochmolekulare Verbindungen (High-molecular Compounds) (Russian), A 9, No. 10, pages 2,246 to 2,249 (1967), in particular page 2,249).

Moreover, these preparation processes have the disadvantage that when the synthesis has ended, phase separation into the organic phase and the aqueous-alkaline washing phase is difficult (formation of a mulmlike layer in the separator).

It is also known (German Offenlegungsschrift 2,117,509) to add small amounts of phosphonites of the formula R—P(—OR)$_2$ to the polycarbonate for the purpose of stabilising the polycarbonate towards heat.

It is also known to use additionally phosphorus acid ester dihalides of the formula

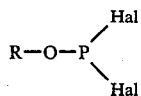

according to German Offenlegungsschrift No. 2,117,510) or phosphonous acid dihalides of the formula

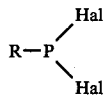

according to German Offenlegungsschrift No. 2,117,176) in small amounts in the polycarbonate preparation in order to stabilise the polycarbonates towards heat.

It is also known to use additionally phosphorus trihalides in the polycarbonate preparation. However, the resulting copolycarbonate/phosphites are only stable to heat if epoxides are simultaneously added (German Offenlegungsschrift No. 2,040,251).

Examples of phosphoric acid diaryl esters of the type

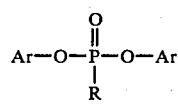

wherein Ar and R have the meaning given in the case of formula (1), which are suitable according to the invention are those of the formula (2)

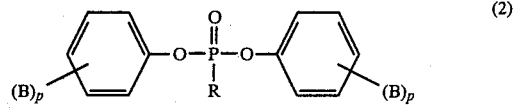

in which

R is $C_1$–$C_{12}$-alkyl, $C_2$–$C_{12}$-alkenyl, $C_6$–$C_{30}$-cycloalkyl, -cycloalkenyl or -aryl, $C_7$–$C_{30}$-arylalkyl or $C_8$–$C_{30}$-arylalkenyl, it being possible for the aryl group to be optionally substituted by 1–5 $C_1$–$C_4$-alkyl groups and/or 1–5 halogen atoms, such as F, Cl or Br, B is a $C_1$–$C_4$-alkyl group and/or F, Cl or Br and p is 0 or an integer from 1 to 5.

Halogen-free alkyl- and aryl-phosphonic acid diphenyl esters are particularly preferred, especially methylphosphonic acid diphenyl ester and phenylphosphonic acid diphenyl ester.

Further examples of phosphonic acid diaryl esters which are suitable according to the invention are cyclohexylphosphonic acid diphenyl ester, ethylphosphonic acid diphenyl ester, 2-phenyl-ethylenephosphonic acid diphenyl ester, butylphosphonic acid diphenyl ester and isopropylphosphonic acid diphenyl ester.

Examples of suitable diphenols of the type HO—X—OH wherein X preferably has 6 to 30 C atoms are those of the following formulae (3) to (6)

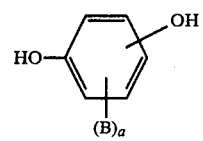

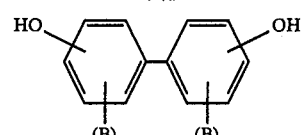

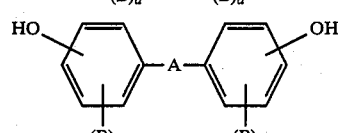

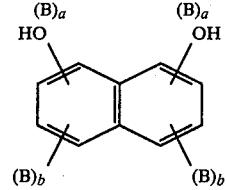

wherein

B is a $C_1$–$C_4$-alkyl group and/or F, Cl or Br, a is 0 or an integer from 1 to 4, b is 0 or an integer from 1 to 3 and A can denote $C_1$–$C_8$-alkylene, $C_2$–$C_8$-alkylidene, $C_5$–$C_6$-cycloalkylene, $C_5$–$C_6$-cycloalkylidene, —SO$_2$—, —CO—, —O— or —S—.

Aromatic dihydroxy compounds of the structure (3), (4) and (5), such as hydroquinone, 4,4'-dihydroxydiphenyl, 4,4'-dihydroxydiphenyl oxide, 4,4'-dihydroxydiphenyl sulphide, 4,4'-sulphonyldiphenol and bis-(4-hydroxyphenyl)-alkanes and -cycloalkanes, such as 2,2-bis-(4-hydroxyphenyl)-methane, 2,2-bis-(4-hydroxyphenyl)-propane (=bisphenol A), 2,2-bis-(3,5-dimethyl- 4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane, are preferred.

4,4'-Dihydroxydiphenyl, 4,4'-sulphonyldiphenol, 1,1-bis-(4-hydroxyphenyl)-cyclohexane, 4,4'-dihydroxydiphenyl sulphide and 2,2-bis-(4-hydroxyphenyl)-propane (bisphenol A) are particularly preferred.

The high-molecular thermoplastic aromatic polyphosphonatocarbonates obtained by the process according to the invention can be branched by incorporation of small amounts, preferably of amounts between 0.05 and 3.0 mol% (relative to 100 mol% of aromatic dihydroxy compounds employed) of compounds which are trifunctional or more than trifunctional, for example compounds with 3 or more than three phenolic hydroxyl groups. It is also possible to co-condense triaryl phosphates, such as, for example, triphenyl phosphate, in amounts of between 0.05 and 3.0 mol% (relative to 100 mol% of the mixture of diaryl carbonate and phosphonic acid diaryl ester employed), as the trifunctional branching component, whereupon the resulting aromatic polyphosphonatocarbonate is branched by phosphoric acid ester groups.

Examples of some of the compounds which have 3 or more than three phenolic hydroxyl groups and which can be used are phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenylisopropyl)-phenol, 2,6-bis-(2-hydroxy-5'-methylbenzyl)-4-methylphenol, 2-(4-hydroxyphenyl)-2-(2,4-dihydroxyphenyl)-propane and 1,4-bis-(4,4''-dihydroxytriphenyl-methyl)-benzene.

Examples of diaryl carbonates of the type

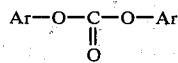

wherein Ar has the meaning given for formula (1), which are suitable according to the invention are diphenyl carbonate and di-(p-tolyl) carbonate. Diphenyl carbonate is particularly preferred.

In the process according to the invention, in each case mixtures of 5 to 95 mol% of diaryl carbonates, 95 to 5 mol% of phosphonic acid diaryl esters and in each case 91 to 99 mol%, in particular 93 to 97 mol%, of diphenols are reacted in the presence of $10^{-7}$ to $2.10^{-4}$ mol, in particular $7.10^{-6}$ to $2.10^{-5}$ mol (relative to 1 mol of diphenol), of a basic catalyst at elevated temperature and under reduced pressure, whilst passing in an inert gas, preferably nitrogen.

Besides nitrogen, carbon dioxide and helium can also be used as inert gases.

Suitable basic catalysts which can be used are the following: alcoholates of alkali metals and/or alkaline earth metals, such as sodium methylate or calcium ethylate, sodium, potassium or lithium phenolates, sodium, potassium or lithium salts of the diphenols of the formulae (3) to (6), hydrides of alkali metals and/or alkaline earth metals, such as lithium hydride, sodium borohydride or calcium hydride, oxides of alkali metals and/or alkaline earth metals, such as lithium oxide, sodium oxide and/or barium oxide, amides of alkali metals and/or alkaline earth metals, such as sodium amide or calcium amide, and basic alkali metal or alkaline earth metal salts of organic or inorganic acids, such as sodium acetate, sodium benzoate or sodium carbonate. Alkali metal phenolates, such as sodium phenolate, are preferably employed.

In the process according to the invention, the phosphonic acid diaryl esters are reacted with the diphenols and diaryl carbonates in the presence of the stated amount of the basic catalysts mentioned, at temperatures between 80° and 340° C., in particular between 100° and 320° C., and the reaction is continued at elevated temperature, in vacuo and whilst passing in nitrogen, the volatile aromatic monohydroxy compounds being distilled off, until the desired degree of condensation has been achieved, which can be established by taking samples.

The basic catalysts can be neutralised with any desired base-binding substances, the exact stoichiometric amount usually being necessary for the neutralisation.

Examples of suitable base-binding substances are dialkyl sulphates, such as dimethyl sulphate and diethyl sulphate, acid chlorides, such as benzoyl chloride, and chloroformic acid esters, such as chloroformic acid phenyl ester, and the basic catalyst can be neutralised in the polymer melt towards the end of the reaction. The volatile organic neutralisation products formed are removed from the melt by distilling off in vacuo. After neutralising the catalyst, the trans-esterification can be continued to a limited extent in order to achieve a desired molecular weight.

When the polycondensation reaction has ended, the polyphosphonatocarbonate melt formed is converted into granules or directly into shaped structures, such as films, fibres or bristles, in a known manner. The aromatic polyphosphonatocarbonates obtained by the process according to the invention can be processed in the melt, without thermal damage, to give shaped structures with a high heat distortion point, and are outstandingly fire-repellent and have good mechanical properties.

With the exception of the polyphosphonatocarbonates of the structure (1) in which X is the thio-bis-phenylene radical, the polyphosphonatocarbonates obtainable according to the invention are soluble in methylene chloride, 1,1,2,2-tetrachloroethane, chlorobenzene, 1,2-dichlorobenzene, chloroform, 1,1,2-trichloroethylene, dioxane and hexamethylene-phosphoric acid triamide (HMPT).

The materials customary for polycarbonates, such as pigments, antistatic agents, mould release agents, heat stabilisers, ultraviolet light stabilisers and reinforcing fillers, can also be admixed to the aromatic polyphosphonatocarbonates obtainable according to the invention.

The thermoplastic aromatic polyphosphonatocarbonates obtainable according to the invention can be extruded at 240° to 320° and shaped into test pieces.

The heat distortion point was determined by measuring the Vicat softening point VSP in accordance with the method of DIN 53 460 or ISO/R 75. The behaviour on impact was determined both by measuring the impact strength $a_n$ in accordance with the method of Charpy described in DIN 53 453 or in accordance with the method of ASTM D 256, and by measuring the notched impact strength $a_k$ in accordance with the method of Charpy described in DIN 53 453 or in accordance with the method of ASTM D 256. The hardness was determined by measuring the ball indentation hardness HB in accordance with the method of DIN 53 456. The mechanical-elastic properties were determined by stress-strain tests, such as by measuring the flexural E modulus in accordance with the method of DIN 53 457, by measuring the tensile E modulus in accordance with the method of DIN 53 457 and by measuring the tensile strength $\delta_R$, the elongation at break $\epsilon_R$, the stretch resistance $\delta_S$ and the elongation $\epsilon_S$, in accordance with the method of DIN 53 455/1968 or ASTM D 638.

The burning properties were determined first by measuring the $O_2$ index in accordance with the method of ASTM D 2863-70 and by measuring the after-burn time in accordance with the method of the UL test (Subj. 94).

To measure the after-burn time, test rods with the diameters $127 \times 12.7 \times 1.6$ mm (1/16") and $127 \times 12.7 \times 3.2$ mm (⅛") were subjected to the test method of Underwriters Laboratories, Inc. Bulletin 94, burning test for the classification of materials.

According to this test method, the materials thus examined are classified as UL-94 V-O, UL-94 V-I and UL-94 V-II, on the basis of the results obtained with 10 samples. The criteria for each of these V classifications according to UL-94 are, briefly, as follows:

UL-94 V-O: the average time of flaming and/or smouldering after removal of the igniting flame should not exceed 5 seconds, and none of the samples should drip particles which ignite absorbent cotton.

UL-94 V-I: the average time of flaming and/or smouldering after removal of the igniting flame should not exceed 25 seconds and none of the samples should drip particles which ignite absorbent cotton.

UL-94 V-II: the average time of flaming and/or smouldering after removal of the igniting flame should not exceed 25 seconds and the samples drip flaming particles which ignite absorbent cotton.

Furthermore, a test rod which burned for more than 25 seconds after removal of the igniting flame was not classified according to UL-94 but was labelled as "burns" according to the standard conditions of the present invention. The instructions of UL-94 furthermore demand that all the test rods of a trial should fulfil the particular V evaluation, otherwise the 10 test rods are classified with the evaluation of the poorest individual rod. For example, if 1 rod is classified as UL-94 V-II and the other 9 test rods are classified as UL-94 V-O, all 10 rods are classified as UL-94 V-II.

EXAMPLE 1

3,592 g (16.79 mols) of diphenyl carbonate, 2,068 g (8.34 mols) of methylphosphonic acid diphenyl ester, 2,712 g (11.89 mols) of bisphenol A, 2,214 g (11.90 mols) of 4,4'-dihydroxydiphenyl, 7.6 g ($1.21.10^{-2}$ mol) of 1,4-bis-(4,4''-dihydroxytriphenyl-methyl)-benzene and 0.2 g ($1.72.10^{-3}$ mol) of sodium phenolate are stirred intensively at 230° C. under nitrogen. Phenol is then distilled off at a temperature rising from 230° to 280° C. and under a pressure which gradually falls from 400 mbar to 10 mbar over a column heated to 100° C., in the course of 5 hours. The reaction is continued for a further 5 hours at 290° to 310° C. and under a pressure of 0.3 mbar, the stirrer speed being lowered to a constant value. After flushing the stirred autoclave with nitrogen, 0.266 g ($1.72.10^{-3}$ mol) of diethyl sulphate are added and the mixture is stirred for 10 minutes and distilled for a further 20 minutes in vacuo. The stirrer is then switched off and the polymer is allowed to settle at 300° C. for 1 hour, and is subsequently isolated by extrusion under pressure (about 10 atmospheres) and granulation of the extruded strands, 5 kg of a highmolecular amorphous polyphosphonatocarbonate with a number-average molecular weight $M_n$ of 17,000, a relative solution viscosity $\eta_{rel}$ of 1.327 (measured at 25° C. in a solution of 0.5 g of the polymer in 100 ml of methylene chloride) and a phosphorus content of 4.5% being obtained.

The glass transition temperature $T_G$ of the polymer from Example 1, determined by differential thermal analysis (DTA), is 147° C.

The polyphosphonatocarbonate according to Example 1 has the following possible theoretical structure:

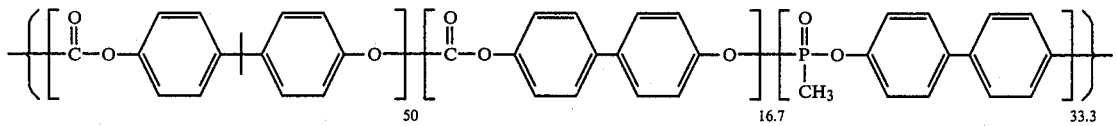

EXAMPLE 2

4,020 g (18.79 mols) of diphenyl carbonate, 1,552 g (6.26 mols) of methylphosphonic acid diphenyl ester, 4,472 g (19.61 mols) of bisphenol A, 1,108 g (5.96 mols) of 4,4'-dihydroxydiphenyl, 7.6 g ($1.21.10^{-2}$ mol) of 1,4-bis-(4,4''-dihydroxytriphenyl-methyl)-benzene and 0.15 g ($1.293.10^{-3}$ mol) of sodium phenolate are reacted by a procedure analogous to that described in Example 1, 0.202 g ($1.293.10^{-3}$ mol) of chlorformic acid phenyl ester being added towards the end of the reaction in order to neutralise the sodium phenolate. 5 kg of a polyphosphonatocarbonate of the theoretical structure

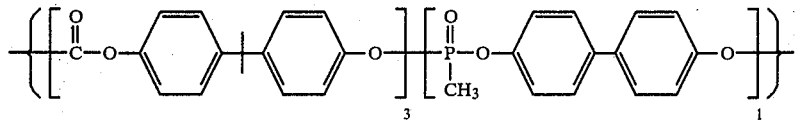

and having the following characteristics are obtained:
$\overline{M}_n = 16,200$
$\eta_{rel} = 1.323$
phosphorus content = 3.1%
$T_G = 148°$ C. (determined by DTA)

The following table contains the fire-repellency values, heat distortion point test values, impact stress test values and test values for the mechanical-elastic properties of the polyphosphonatocarbonates obtained according to Examples 1 and 2.

TABLE

Fire-repellency values and mechanical test values of the aromatic polyphosphonatocarbonates according to Examples 1 and 2:

| Test | Test standard | Test values: Example 1 | Example 2 |
|---|---|---|---|
| $O_2$ index | ASTM D 2863-70 | 59% | 51% |
| UL test (Subj. 94) | | V-O (1/16″) | V-O (1/16″) |
| Vicat B temperature | DIN 53 460 | 141° C. | 142° C. |
| Impact strength $a_n$ | DIN 53 454 | unbroken | unbroken |
| Notched impact strength $a_k$ | DIN 53 453 | 20 | 22 |
| Ball indentation hardness HB | DIN 53 456 | 112 MPa | 120 MPa |
| Flexural E modulus | DIN 53 457 | 2,300 MPa | 2,400 MPa |
| Tensile E modulus | DIN 53 457 | 2,400 MPa | 2,500 MPa |
| Stretch resistance $\delta_S$ | DIN 53 455 | 66 MPa | 70 MPa |
| Elongation $\epsilon_S$ | DIN 53 455 | 9% | 10% |
| Tensile strength $\delta_R$ | DIN 53 455 | 61 MPa | 58 MPa |
| Elongation at break $\epsilon_R$ | DIN 53 455 | 59% | 26% |
| $\eta_{rel}$ (after extrusion at 300° C.) | | 1.321 | 1.317 |

The following are further examples of the aromatic polyphosphonatocarbonates prepared by the process according to the invention:

EXAMPLE 3

100.5 g (0.4696 mol) of diphenyl carbonate, 38.8 g (0.1564 mol) of methylphosphonic acid diphenyl ester, 0.15 g ($0.46 \cdot 10^{-3}$ mol) of triphenyl phosphate, 90.5 g (0.3969 mol) of bisphenol A, 43.25 g (0.1984 mol) of 4,4'-dihydroxydiphenyl sulphide and 5 mg ($0.431 \cdot 10^{-5}$ mol) of sodium phenolate are reacted by a procedure analogous to that described in Example 1, and at the end of the reaction the sodium phenolate is neutralised with 6.8 mg of chloroformic acid phenyl ester.

The resulting polyphosphonatocarbonate has the theoretical structure:

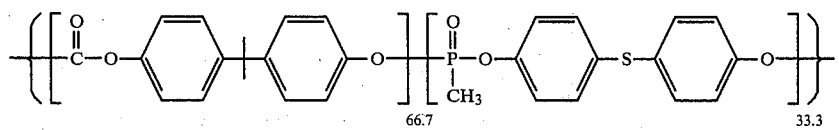

and the following characteristics:
$\eta_{rel} = 1.345$
$\overline{M}_n = 20,500$
P = 2.99%; S = 4.11%
$T_G = 124°$ C. (determined by DTA)

EXAMPLE 4

89.8 g (0.4196 mol) of diphenyl carbonate, 51.7 g (0.2084 mol) of methylphosphonic acid diphenyl ester, 0.15 g ($0.46 \cdot 10^{-3}$ mol) of triphenyl phosphate, 90.5 g (0.3969 mol) of bisphenol A, 43.25 g (0.1984 mol) of 4,4'-dihydroxydiphenyl sulphide and 5 mg ($0.431 \cdot 10^{-5}$ mol) of sodium phenolate are reacted by a procedure analogous to that described in Example 3. The resulting polyphosphonatocarbonate has the theoretical structure

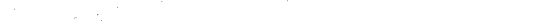

and the following characteristics:
$\eta_{rel} = 1.420$
$\overline{M}_n = 28,700$
P = 2.93%
S = 3.03%
$T_G = 120°$ C. (determined by DTA)

EXAMPLE 5

155.1 g ($62.54 \cdot 10^{-2}$ mol) of methylphosphonic acid diphenyl ester, 7.04 g ($3.29 \cdot 10^{-2}$ mol) of diphenyl carbonate, 113.6 g ($61.08 \cdot 10^{-2}$ mol) of 4,4'-dihydroxydiphenyl and 10 mg ($0.862 \cdot 10^{-5}$ mol) of sodium phenolate are reacted by a procedure analogous to that described in Example 1 and, at the end of the reaction, the sodium phenolate is neutralised with 13.5 mg of chloroformic acid phenyl ester. The resulting polyphosphonatocarbonate has the structure:

and the following characteristics:
$\eta_{rel} = 1.293$
$\overline{M}_n = 24,800$
P = 10.7%
$T_G = 129°$ C. (determined by DTA)

EXAMPLE 6

133.8 g ($62.54 \cdot 10^{-2}$ mol) of diphenyl carbonate, 8.16 g ($3.29 \cdot 10^{31\ 2}$ mol) of methylphosphonic acid diphenyl ester, 139.3 g ($61.08 \cdot 10^{-2}$ mol) of bisphenol A and 5 mg ($0.431 \cdot 10^{-5}$ mol) of sodium phenolate are reacted by a procedure analogous to that described in Example 3. The resulting polyphosphonatocarbonate has the structure

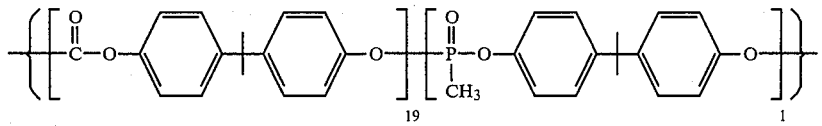

and the following characteristics:
$\eta_{rel} = 1.316$
$\overline{M}_n = 27,200$
P = 0.61%
$T_G = 143°$ C. (determined by DTA)

COMPARISON EXAMPLES (a) The polyphosphonatocarbonate prepared according to Example 1 of U.S. Pat. No. 3,378,523 has a relative solution viscosity $\eta_{rel}$ of 1.58, measured at 25° C. in a 0.5% strength by weight solution in methylene chloride, and contains 420 ppm of the phenylphosphonic acid ester structure.

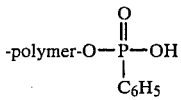

Granules obtained from this polymer after extrusion at 270° C. have a $\eta_{rel}$ of 1.21; shaped articles produced from these granules are brittle and break easily.

(b) The polyphosphonatocarbonate prepared according to Example VIII of U.S. Pat. No. 3,378,523 has a relative solution viscosity $\eta_{rel}$ of 1.30 and contains 530 ppm of the phenylphosphonic acid ester structure

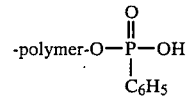

Granules obtained from this polymer after extrusion at 270° C. have a relative solution viscosity $\eta_{rel}$ of 1.17.

We claim:

1. A process for preparing an aromatic, thermoplastic polyphosphonatocarbonate which comprises polycondensing (a) at least one aromatic dihydroxy compound having 6 to 30 carbon atoms with (b) a diaryl carbonate having 6 to 14 carbon atoms in each aryl moiety and (c) a phosphonic acid diaryl ester having 6 to 14 carbon atoms in each aryl moiety in the pressure of a catalytic amount of a basic polycondensation catalyst at a temperature of from 80° to 340° C. and under a pressure of from 600 to 0.1 mm Hg in an inert gaseous atmosphere, the molar ratio of (b) to (c) being from 5:95 to 95:5 and the molar ratio of (a) to the sum of (b) and (c) being from 0.91:1 to 0.99:1, and following polycondensation, neutralizing said basic catalyst.

2. The process of claim 1 wherein said reaction is carried out at a temperature from 100° to 320° C.

3. The process of claim 1 wherein the reaction is carried out under a pressure of 350 to 1.0 mm Hg.

4. The process of claim 1 wherein the molar ratio of (b) to (c) is from 15:85 to 85:15.

* * * * *

UNITED STATES PATENT AND TRADEMARK OFFICE
CERTIFICATE OF CORRECTION

PATENT NO. : 4,322,520
DATED : March 30, 1982
INVENTOR(S) : Manfred Schmidt et al It is certified that error appears in the above-identified patent and that said Letters Patent is hereby corrected as shown below:

Col. 1, line 36 change "1.24 to 140/$\eta$rel" to

--1.24 to 1.40/$\eta$rel --

Col. 2, line 21 change "$C_2$-$C_{12}$-alkyl" to
--$C_2$-$C_{12}$ alkenyl --

Col. 12, line 24, change "pressure" to --presence--

Signed and Sealed this

Fifteenth Day of February 1983

[SEAL]

Attest:

GERALD J. MOSSINGHOFF

Attesting Officer

Commissioner of Patents and Trademarks